United States Patent
Lee et al.

(10) Patent No.: US 9,016,758 B1
(45) Date of Patent: Apr. 28, 2015

(54) TONNEAU COVER GAP HIDER FOR ADJUSTABLE REAR SEATS

(71) Applicant: Ford Global Technologies, LLC, Dearborn, MI (US)

(72) Inventors: Benjamin Lee, Dearborn, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/100,295

(22) Filed: Dec. 9, 2013

(51) Int. Cl.
   *B60R 5/04* (2006.01)
(52) U.S. Cl.
   CPC ..................................... *B60R 5/047* (2013.01)
(58) Field of Classification Search
   USPC ............. 296/36.1, 37.16, 98, 100.01, 100.11, 296/100.15, 100.16, 136.03, 136.1; 224/328, 539
   See application file for complete search history.

(56) References Cited

U.S. PATENT DOCUMENTS

| 5,011,208 A | 4/1991 | Lewallen |
| 5,584,523 A | 12/1996 | Kawaguchi |
| 7,343,956 B2 * | 3/2008 | Schleef et al. ............... 160/23.1 |
| 7,815,235 B2 | 10/2010 | Hayashi et al. |
| 8,465,079 B2 | 6/2013 | Saito et al. |
| 8,523,268 B2 | 9/2013 | Kikuchi et al. |
| 2003/0102691 A1 * | 6/2003 | Schlecht et al. ......... 296/100.15 |

FOREIGN PATENT DOCUMENTS

| DE | 102010039763 |   | 3/2012 |
| EP | 1787864 |   | 3/2009 |
| JP | 2002362228 A | * | 12/2002 |
| JP | 2003212048 A | * | 7/2003 |

OTHER PUBLICATIONS

Japanese to English translation of JP 2002-362228, retreived Sep. 11, 2014 via the Industrial Property Digital Library website.*

* cited by examiner

*Primary Examiner* — Glenn Dayoan
*Assistant Examiner* — Jason S Daniels
(74) *Attorney, Agent, or Firm* — Vichit Chea; Price Heneveld LLP

(57) ABSTRACT

A tonneau cover for a vehicle includes a housing, a first cover having a cover tab, wherein the first cover selectively extends from an interior of the housing to engage a rear seat, a second cover selectively extendable from the interior of the housing opposite the first cover and a seatback of the rear seat having a seat tab that engages the cover tab when the seatback is placed in an upright position.

18 Claims, 11 Drawing Sheets

TONNEAU COVER GAP HIDER FOR ADJUSTABLE REAR SEATS

FIELD OF THE INVENTION

The present invention generally relates to tonneau covers for rear cargo areas of vehicles, and more specifically, tonneau covers for the rear cargo area of a vehicle, for vehicles with rear adjustable seats.

BACKGROUND OF THE INVENTION

Various automobiles, typically, SUVs and CUVs, include an open rear cargo area that can be covered using a tonneau cover that engages portions of the interior of the vehicle. A tonneau cover typically covers a portion of the rear cargo area when not in use. Tonneau covers can also be used to substantially secure various lightweight items within the rear cargo area under the tonneau cover such that these lighter weight items are kept within the rear cargo area. Typically, the tonneau cover is an aesthetic member meant to conceal portions of the rear cargo area. Conventional tonneau covers are unable to accommodate the adjustability and plurality of configurations offered by current automobiles and typically do not extend functionality to a vehicle with these varying configurations.

SUMMARY OF THE INVENTION

In at least one aspect, a tonneau cover for a vehicle includes a housing, a first cover having a cover tab, wherein the first cover selectively extends from an interior of the housing to engage a rear seat, a second cover selectively extendable from the interior of the housing opposite the first cover and a seatback of a seat having a seat tab that engages the cover tab when the seatback is placed in an upright position.

In at least another aspect, a tonneau cover for a vehicle includes a front cover including a cover tab selectively extendable from a cover housing, a rear seat including a seatback operable between folded and upright positions, a seat tab of the seatback that couples with the cover tab when the seatback is in the upright position and a rear cover selectively extendable from the cover housing.

In at least another aspect, a tonneau cover for a vehicle includes a cover housing having a forward-extendable cover selectively extending from an interior of the cover housing, wherein the forward-extendable cover is biased toward the cover housing and a rear seat configured to engage the forward-extendable cover when the rear seat is in a seating position, and further configured to disengage the forward-extendable cover when the rear seat is moved to a folded position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
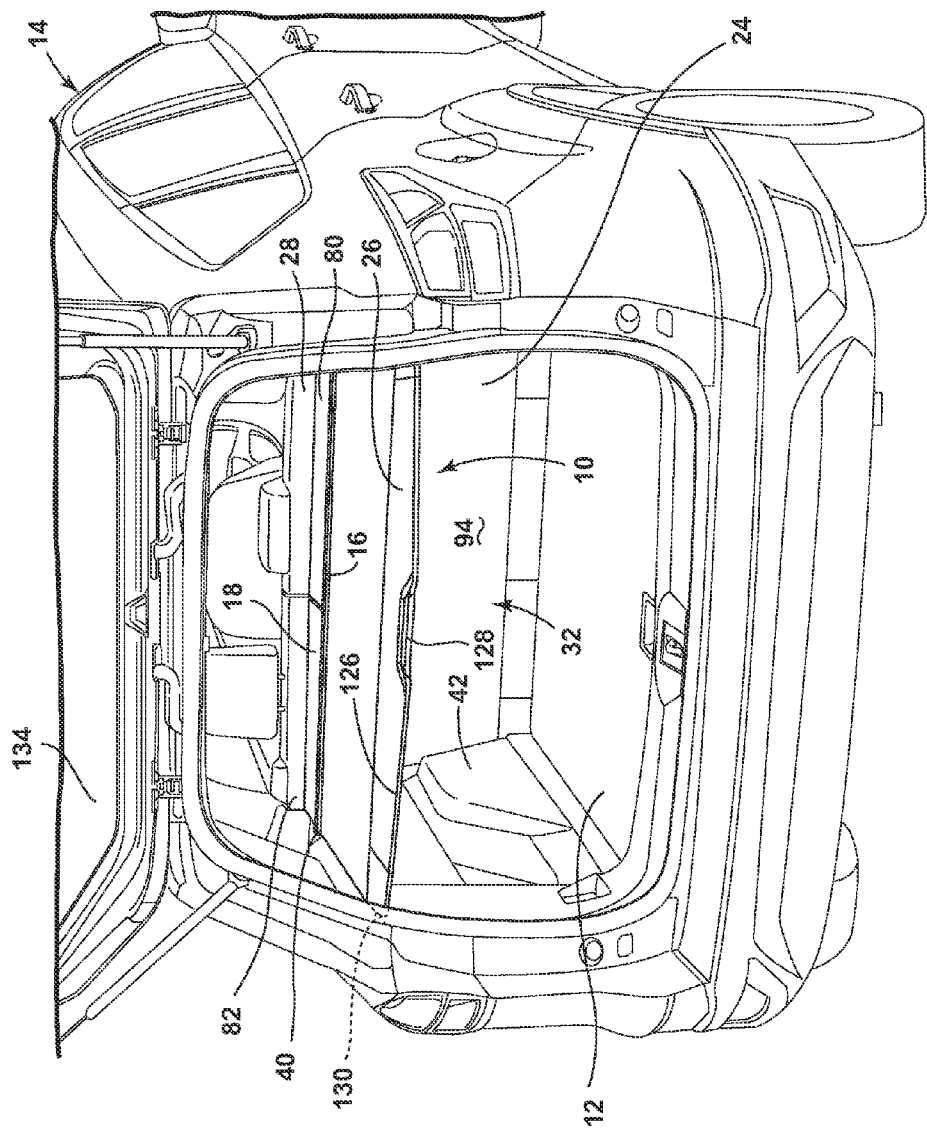
FIG. 1 is a rear top perspective view of a vehicle with one embodiment of the tonneau cover installed within and extended across the rear cargo area.
Figure 2:
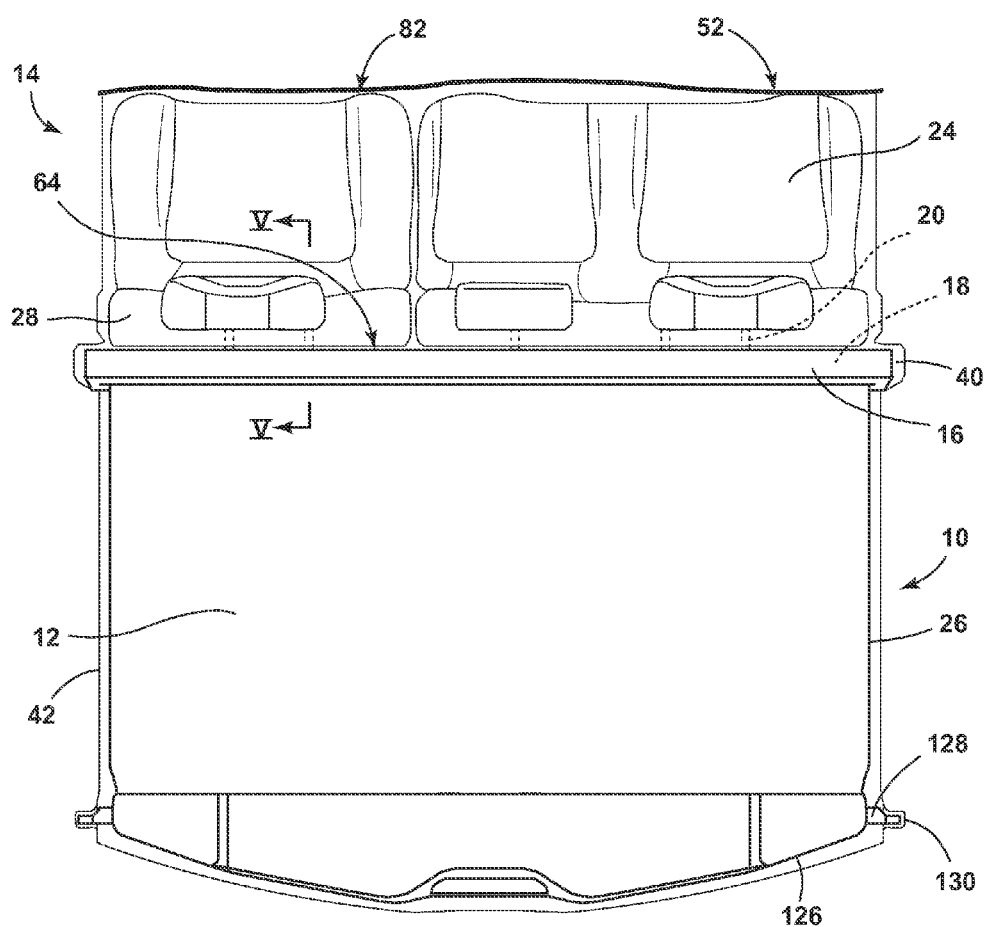
FIG. 2 is a top plan view of the embodiment of FIG. 1 with the seat in the rearward position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, reference numeral 10 generally refers to an adjustable tonneau cover shown installed within the rear cargo area 12 of a vehicle 14, according to one embodiment. The adjustable tonneau cover 10 includes a housing 16 and a first cover 18 having a cover tab 20, wherein the first cover 18 selectively extends from an interior 22 of the housing 16 to engage a rear seat 24. A second cover 26 is selectively extendable from the interior 22 of the housing 16 and is configured to extend in a direction opposite the first cover 18. A seatback 28 of the rear seat 24 includes a seat tab 30 that engages the cover tab 20 when the seatback 28 is placed in an upright position 32.

As generally illustrated in the embodiment depicted in FIGS. 1-4, the tonneau cover 10 is selectively installed within the rear cargo area 12 of a vehicle 14, such that the housing 16 of the adjustable tonneau cover 10 is installed within a housing receptacle 40 defined by the interior side panels 42 of the vehicle 14 within the rear cargo area 12. It is contemplated that the housing receptacle 40 can be molded into the interior side panel 42 of the vehicle 14, or can be a separate fixture attached to the interior side panels 42. In various embodiments, the housing receptacle 40 can include one or more retention features that are configured to substantially secure the housing 16 of the adjustable tonneau cover 10 within the housing receptacle 40. Such retention features can include, but are not limited to, tabs, hooks, interference mechanisms, locks, as well as other similar features.

Referring again to FIGS. 1-6, the rear seat 24 of the vehicle 14 is configured to move laterally between a forward position 50 and a rearward position 52, relative to the housing receptacle 40 that holds the housing 16 of the adjustable tonneau cover 10. In such an embodiment, the first cover 18 is configured to extend and retract with the lateral movement of the rear seat 24 when the cover tab 20 is engaged with the seat tab 30. In this manner, when the cover tab 20 is engaged with the seat tab 30, and the rear seat 24 is moved to a forward position 50, the first cover 18 extends from the housing 16 into a front area between the housing 16 and the rear seat 24 such that the first cover 18 conceals a front portion 54 of the rear cargo area 12 between the housing 16 and the rear seat 24. In this manner, the cover tab 20 and the seat tab 30 are configured to remain engaged as the rear seat 24 is moved laterally, and when the rear seat 24 is in an upright position 32.

Referring now to the embodiment shown in FIGS. 4-6 and 9, the housing 16 includes a front spool 60 that is coupled to the first cover 18, wherein the front spool 60 is configured to rotate within the housing 16 to selectively extend and retract the first cover 18, as the rear seat 24 is moved between the forward and rearward positions 50, 52. It is contemplated that the front spool 60 includes a rotational biasing mechanism 62 that is configured to place the first cover 18 in a front refracted position 64 that is defined by the cover tab 20 being positioned proximate a front aperture 66 of the housing 16. In the front retracted position 64, the cover tab 20 is positioned to receive the seat tab 30 when the rear seat 24 is moved to an upright position 32, as will be described more fully below. The rotational biasing mechanism 62 of the front spool 60 exerts an inwardly directed biasing force 68 against the first cover 18. In this manner, when the rear seat 24 is moved from the forward to the rearward position 50, 52, the rotational biasing mechanism 62 of the front spool 60 is configured to retract the first cover 18 so as to maintain the first cover 18 in a substantially taut configuration over the front portion 54 of the rear cargo area 12. Conversely, the movement of the rear seat 24 from the rearward position 52 to the forward position 50 is configured to overcome the inward biasing force 68 exerted by the rotational biasing mechanism 62 of the front spool 60 such that the movement of the rear seat 24 can extend the first cover 18 from the housing 16 in order to substantially cover the front portion 54 of the rear cargo area 12.

Figure 3:
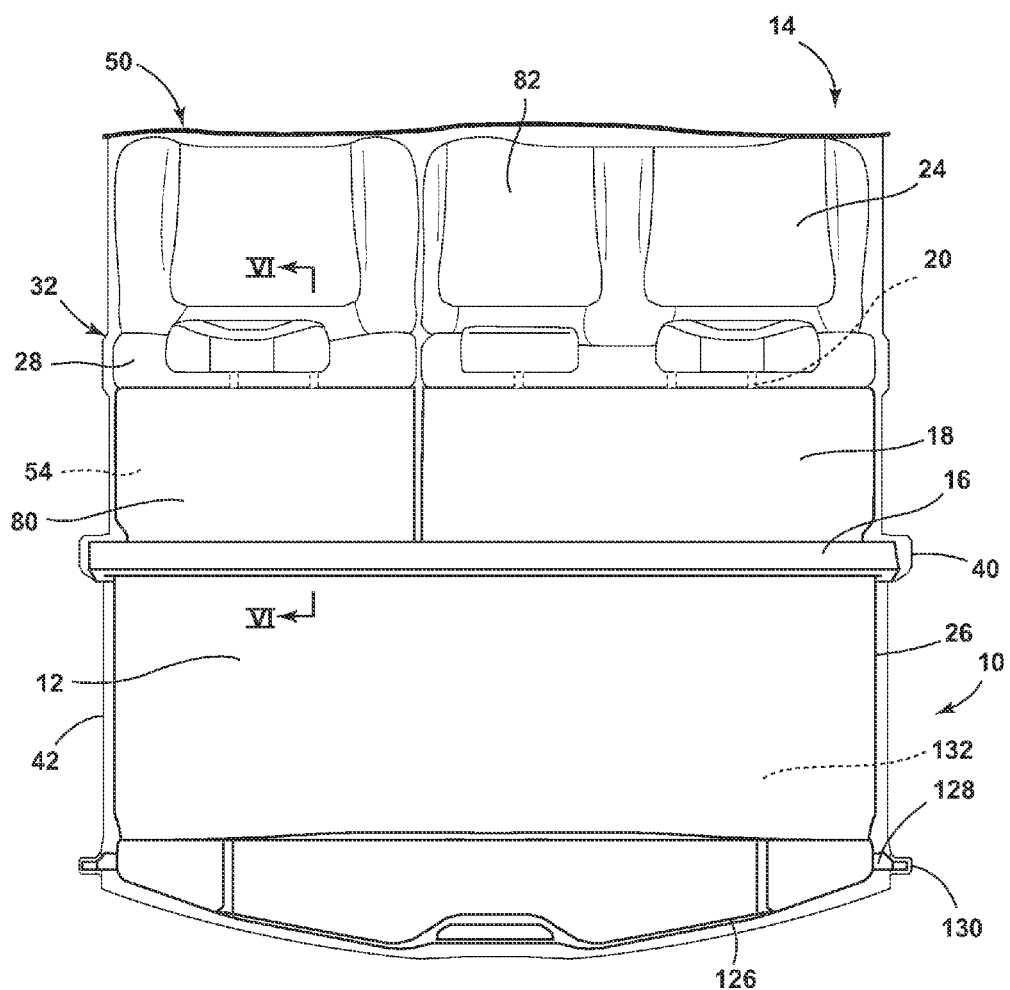
FIG. 3 is a top plan view of the embodiment of FIG. 2 with the rear seat in the forward position.
Figure 4:
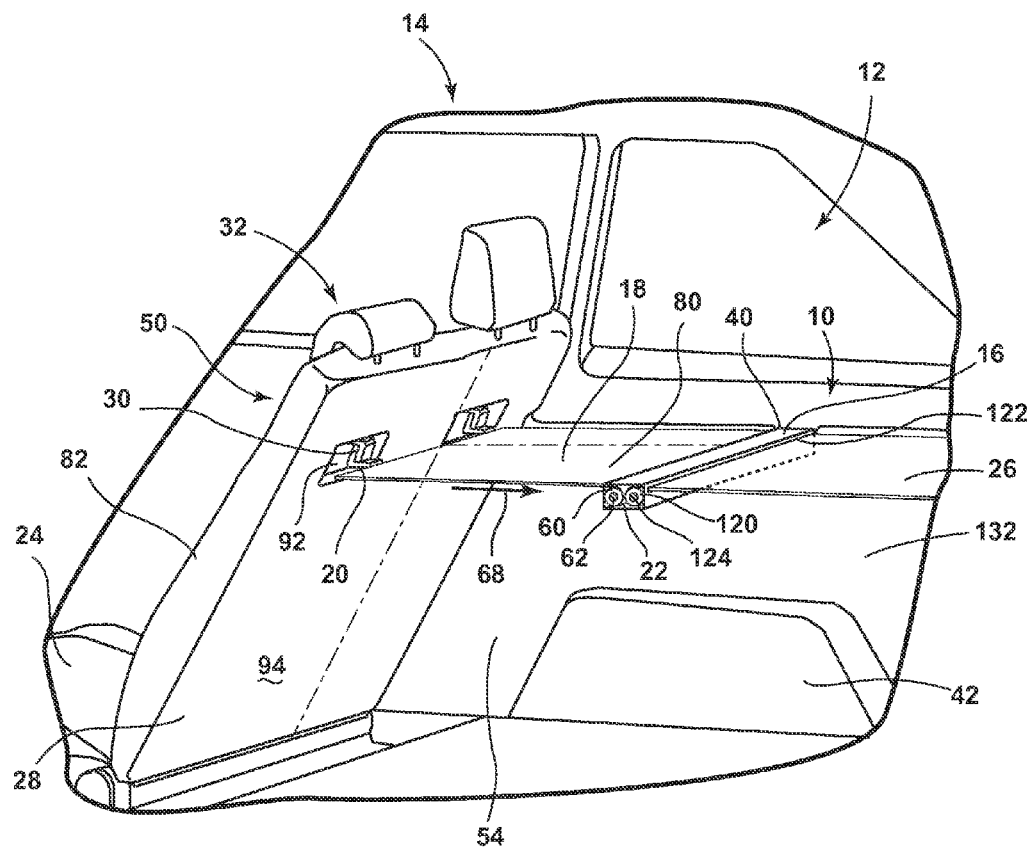
FIG. 4 is a side top perspective view of the embodiment of FIG. 3.
Figure 5:
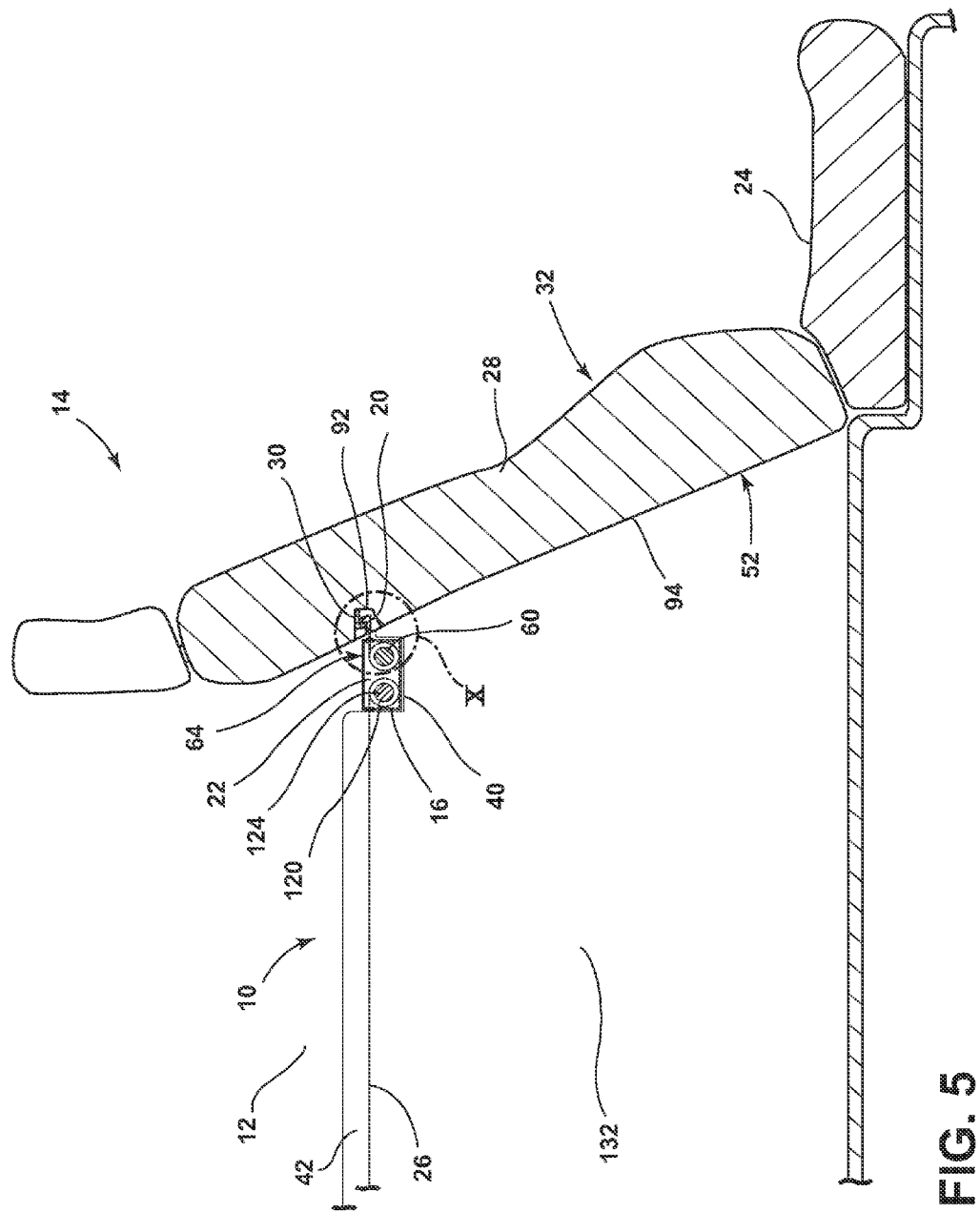
FIG. 5 is a cross-sectional view of the embodiment of FIG. 2 with the rear seat in the rearward position, taken along line V-V.
Figure 6:
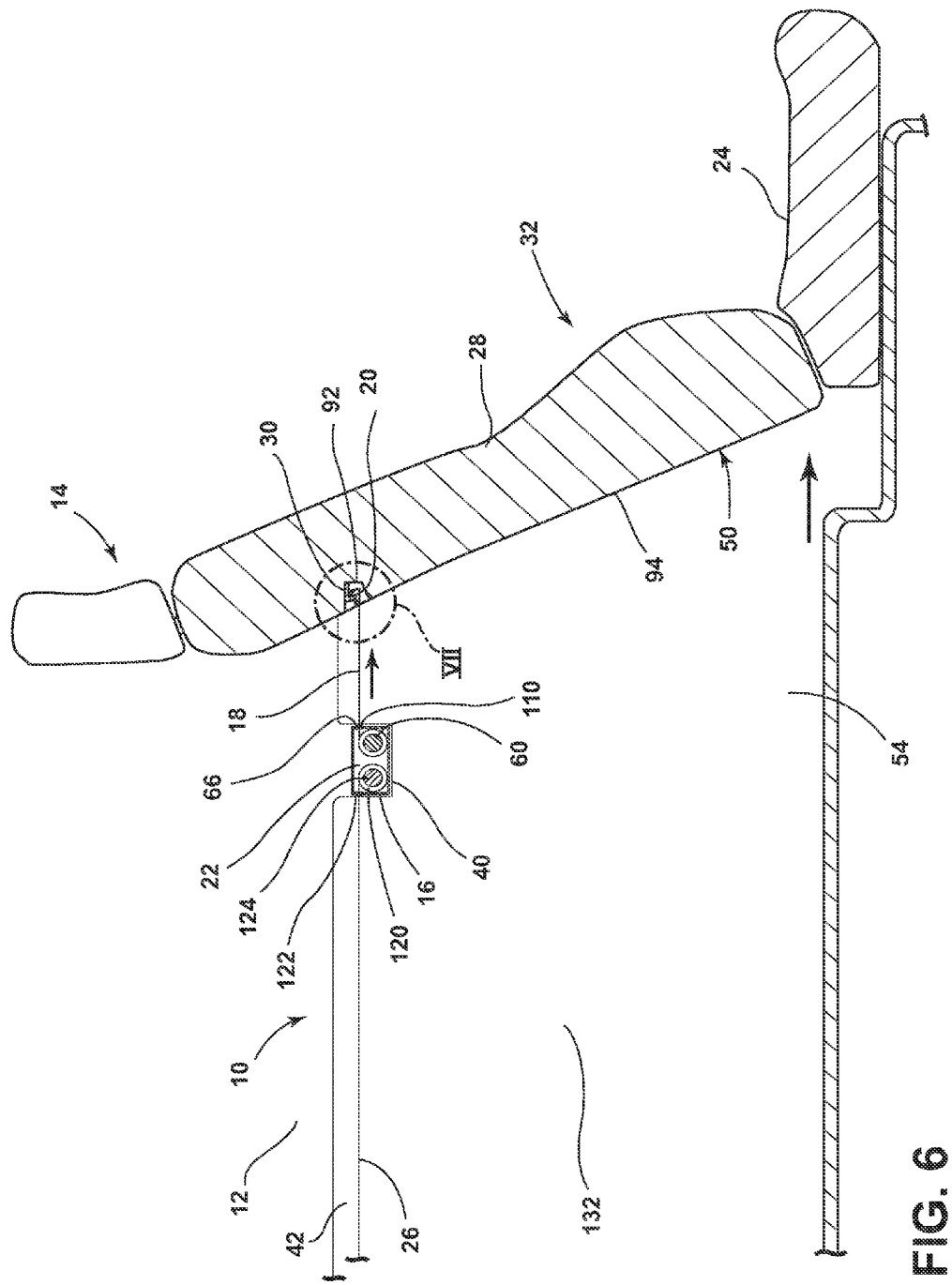
FIG. 6 is a cross-sectional view of the embodiment of FIG. 3 with the rear seat in the forward position, taken at line VI-VI.
Figure 7:
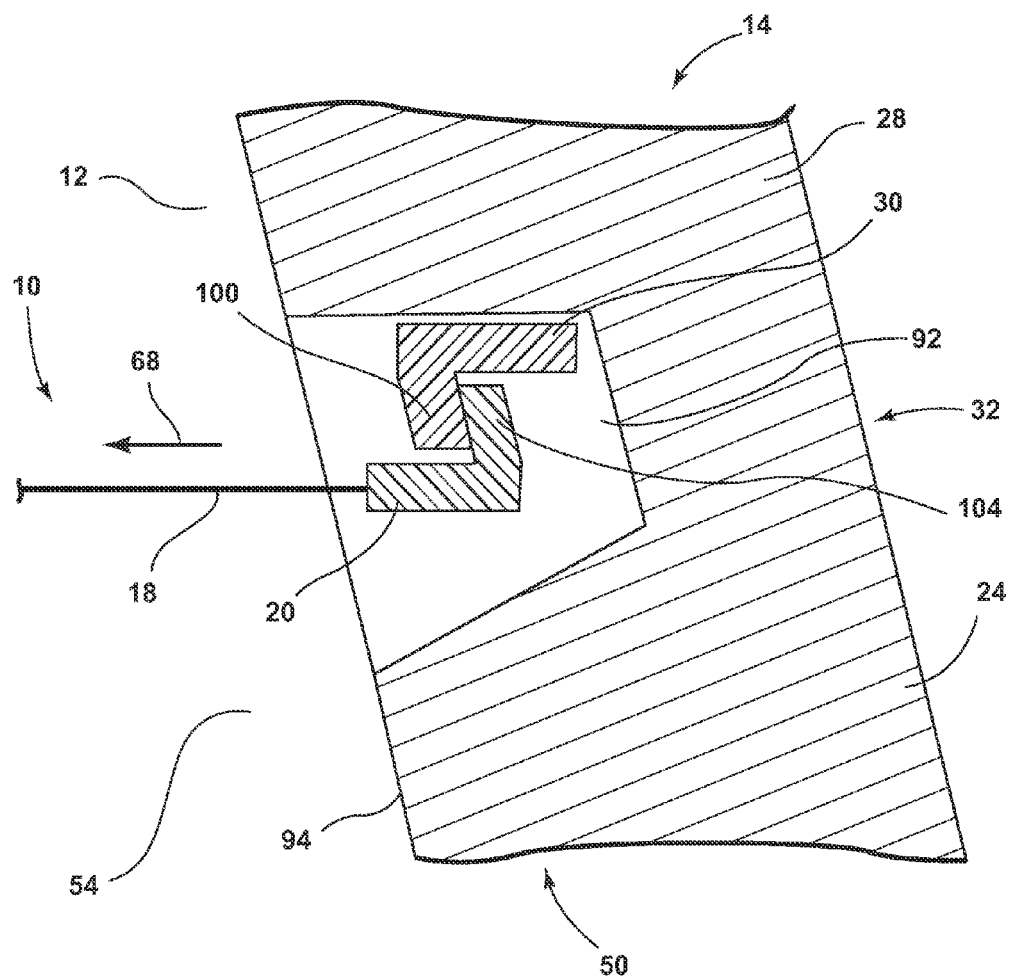
FIG. 7 is a detail sectional view of FIG. 6 taken at area VII.
Figure 8:
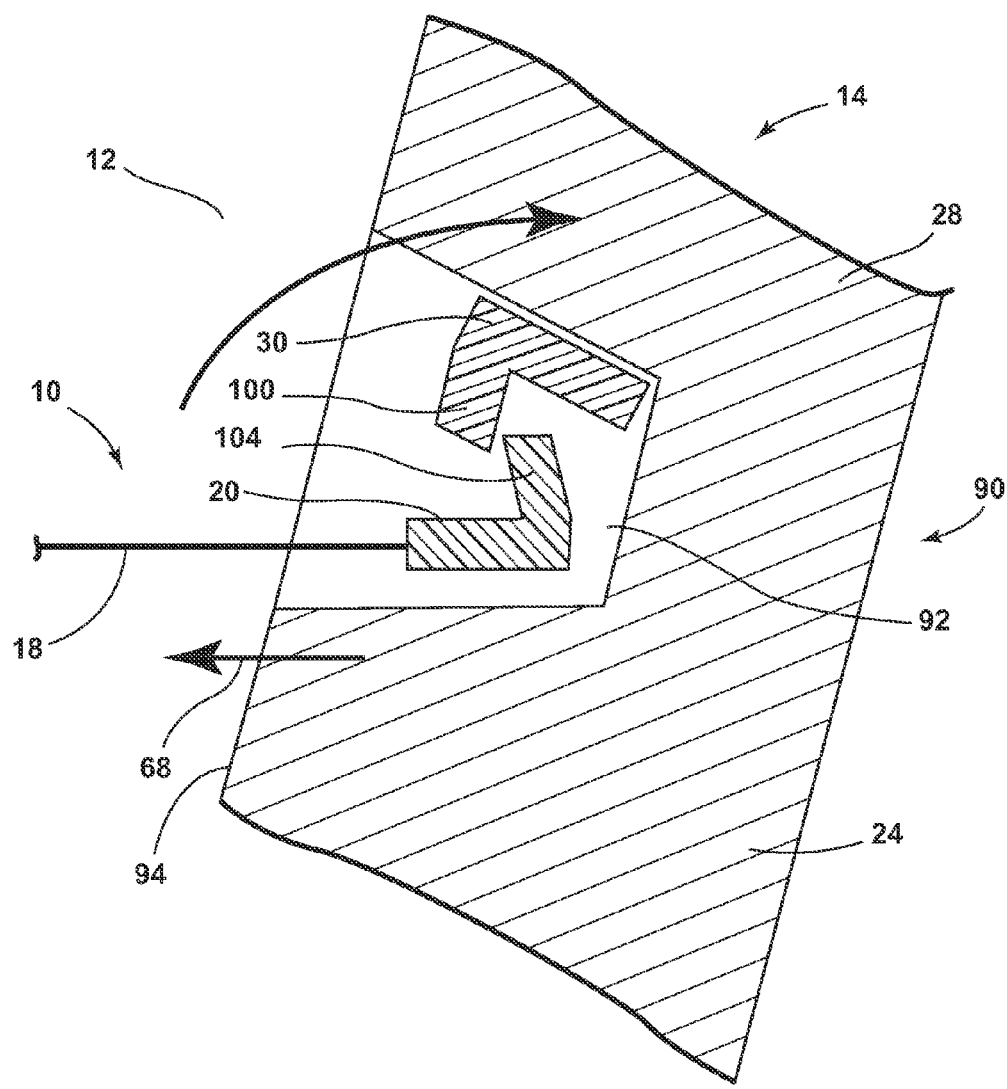
FIG. 8 is a second detail sectional view of FIG. 5 with the seatback rotated toward a folded position.

As shown in the embodiment of FIGS. 1 and 3, it is contemplated that the first cover 18 can be separated into cover subsections 80 that are configured to cooperate with seating subsections 82 of the rear seat 24. The seating subsections 82 of the rear seat 24 can include two or more seating subsections 82 that are individually operable between forward and rearward positions 50, 52. In this manner, each cover subsection 80 of the first cover 18 is configured to extend and retract independently of the other cover subsections 80 of the first cover 18 to cooperate with the lateral movements of each respective seating subsection 82 of the rear seat 24. The rear seat 24, front spool 60 and first cover 18 can be configured into multiple configurations that can include, but are not limited to, two seating subsections 82 split into a 50/50 configuration, two seating subsections 82 split into a 40/60 configuration, three seating subsections 82 split into a 40/20/40 configuration, as well as other seat configurations. Where the rear seat 24 is split into a plurality of seating subsections 82, each cooperating cover subsection 80 of the first cover 18 is configured to include separate cover tabs 20 that cooperate with seat tabs 30 of each respective seating subsection 82. In this manner, cooperating cover and seat tabs 20, 30 of respective cover subsections 80 and seating subsections 82 can be individually engaged and disengaged as desired by the user.

Referring now to the embodiment illustrated in FIGS. 4 and 7-10, the seat tab 30 and the cover tab 20 are configured to be disengaged when the seatback 28 is rotated from the upright position 32 to a folded position 90. In various embodiments, the seat tab 30 is configured to be disposed within a recess 92 defined within the back surface 94 of the seatback 28, such that the seat tab 30 is fixed within the recess 92. In alternate embodiments, the seatback 28 includes no recess 92 and the seat tab 30 is mounted to the back surface 94 of the seatback 28. As the seatback 28 is rotated forward, toward the folded position 90, the seat tab 30 is rotated out of engagement with the cover tab 20. Once disengaged, the first cover 18 is retracted toward the housing 16 by the rotational biasing mechanism 62 of the front spool 60. The first cover 18 is refracted so that the cover tab 20 is disposed against a front surface 96 of the housing 16 and positioned in a substantially horizontal configuration. In this manner, the cover tab 20 is aligned to receive the seat tab 30 as the rear seat 24 is rotated to the upright position 32. It is contemplated that the rotational biasing mechanism 62 of the front spool 60 can include a slowing mechanism to prevent the first cover 18 from retracting too quickly by allowing for a slowed retraction of the first cover 18.

Figure 9:
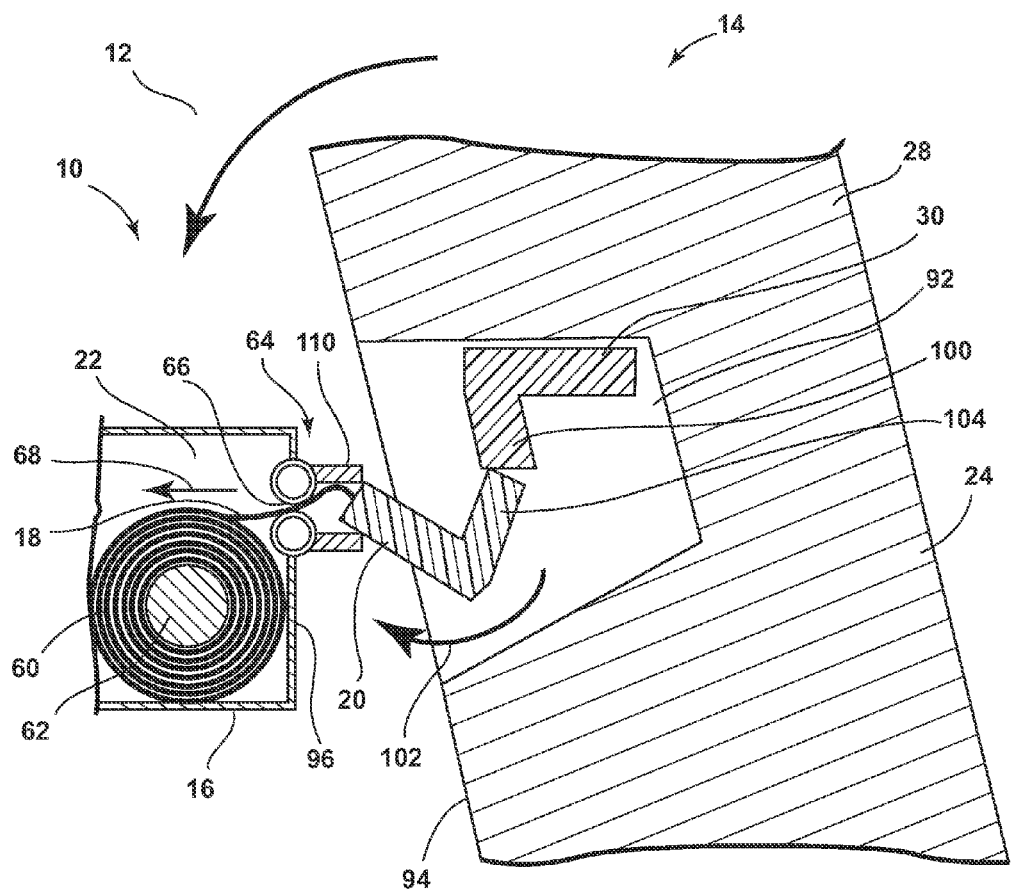
FIG. 9 is a detail sectional view of FIG. 8 with the seatback rotated from the folded position toward the upright position.
Figure 10:
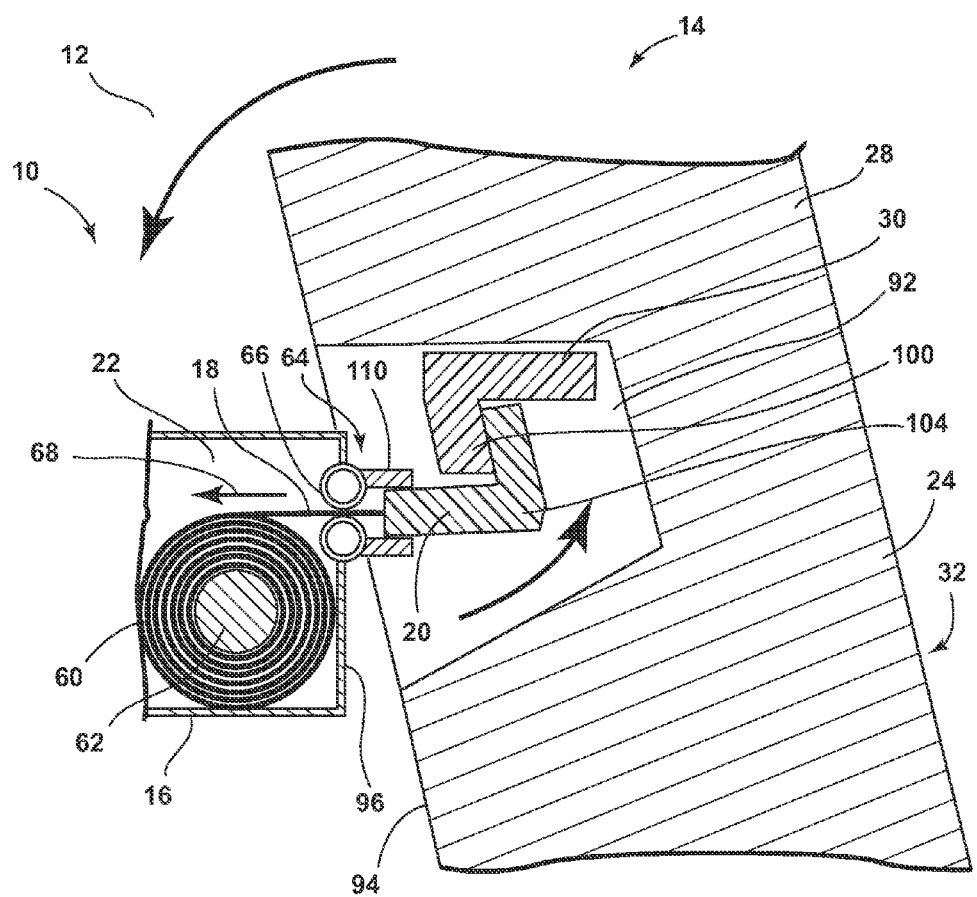
FIG. 10 is a detail sectional view of FIG. 5 with the seatback rotated fully into the upright position taken at area X.

Referring again to the embodiment of FIGS. 9-10, when the rear seat 24 is rotated to the upright position 32, a first angled member 100 of the seat tab 30 is configured to exert a downward biasing force 102 against a second angled member 104 of the cover tab 20. In this embodiment, the cover tab 20 is biased downward by the first angled member 100 as the first angled member 100 of the seat tab 30 passes by the second angled member 104 of the cover tab 20. After the first angled member 100 passes the second angled member 104, the downward biasing force 102 of the first angled member 100 is removed from the second angled member 104 of the cover tab 20 such that the cover tab 20, due to the inward biasing force 68, is rotated back to the substantially horizontal configuration and into engagement with the seat tab 30. Accordingly, the first angled member 100 of the seat tab 30 matingly attaches to the second angled member 104 of the cover tab 20 to define the engagement between the seat tab 30 and the cover tab 20. Through this engagement, as described above, the lateral movement of the rear seat 24 between the rearward and forward positions 52, 50 extends and retracts the first cover 18 to substantially cover a front portion 54 of the rear cargo area 12.

As illustrated in the embodiment of FIGS. 9-10, the housing 16 includes alignment tabs 110 disposed proximate the front aperture 66 of the housing 16. The alignment tabs 110 are configured to receive the cover tabs 20 of the first cover 18 in the front retracted position 64. In this manner, the alignment tabs 110 are configured to work cooperatively with the inward biasing force 68 exerted on the first cover 18 by the rotational biasing mechanism 62 of the front spool 60 to position the cover tab 20 in a substantially horizontal configuration. As such, the cover tab 20 is positioned to receive the seat tab 30 when the seatback 28 is rotated into the upright position 32 and/or the rear seat 24 is moved to the rearward position 52. Additionally, the alignment tabs 110 are further configured to allow for rotational movement of the cover tab 20 as the seat tab 30 displaces the cover tab 20, as described above. It is contemplated that the alignment tabs 110, in various embodiments, can be a recess 92 defined within the front surface 96 of the housing 16, rather than tabs that extend from the housing 16. It is also contemplated that the alignment tabs 110 can be configured to position the cover tab 20 on a predetermined and non-horizontal angle to receive the seat tab 30.

In various embodiments, when the seatback 26 is rotated from the folded position 90 to the upright position 32, the seat tab 30 can engage the cover tab 20 when the rear seat 24 is in the rearward position 52. It is contemplated that in various embodiments, the lateral movement of the rear seat 24 toward the rearward position 52 can also result in the engagement between the seat tab 30 and the cover tab 20, as described above. In such an embodiment, the seat tab 30 can be engaged with the cover tab 20 either by the rotation of the seatback 28 to the upright position 32 or by the lateral movement of the rear seat 24 to the rearward position 52, or a combination of the two movements. It is contemplated that the engagement between the seat tab 30 and the cover tab 20 can be accomplished through either a manually operated seat or an automatic, motorized seat. Additionally, the rear seat 24 can include a mechanism, either manual or automatic, whereby the rear seat 24 can be configured to automatically move into engagement with the first cover 18 such that the seat tab 30 is engaged with the cover tab 20.

In various embodiments, the first angled member 100 of the seat tab 30 and the second angled member 104 of the cover tab 20 are configured as cooperating hook-type features that are positioned to remain engaged during operation of the vehicle 14. The first and second angled members 100, 104 are also configured such that the cover and seat tabs 20, 30 can be disengaged by rotating the seat tab 30 by rotating the seatback 28 to the folded position 90, or by manually disengaging the cover tab 20 from the seat tab 30.

Referring again to the embodiment shown in FIGS. 1-5, the housing 16 can include a rear spool 120 that is coupled with the second cover 26, wherein the rear spool 120 is configured to rotate within the housing 16 to selectively extend and retract the second cover 26 through a rear aperture 122 of the housing 16. The rear spool 120 is configured to include a second rotational biasing mechanism 124 that is configured to exert a biasing force against the second cover 26 to bias the second cover 26 in a retracted position such that an end 126 of the second cover 26 is disposed proximate the rear aperture 122 of the housing 16. The second cover 26 is configured to include a rigid member 128 positioned proximate the end 126 of the second cover 26, wherein the rigid member 128 is configured to be disposed within a secondary receptacle 130 proximate the rear door or lift gate 134 of the rear cargo area 12 and defined by the interior side panels 42 or the rear door or lift gate 134 of the vehicle 14. In this manner, the second cover 26 can be extended and retracted to selectively cover a rear portion 132 of the rear cargo area 12.

In various embodiments, the housing 16 includes a single rear spool 120 and one or more front spools 60 for each first cover subsection 80. Each front and rear spool 60, 120 is rotationally coupled the interior 22 of the housing 16. Dividing walls can be disposed between each front spool 60 to provide a structural mounting surface between adjacent subsections of the front spool 60. The rotational biasing mechanisms 62, 124 of the front and rear spools 60, 120, respectively, can be disposed either within the front and rear spools 60, 120 or external to the front and rear spools 60, 120 but within the interior 22 of the housing 16. The rotational biasing mechanisms 62, 124 can include, but are not limited by, springs, rotating springs, elastic members and other similar biasing mechanisms.

It is also contemplated that the first and second covers 18, 26 of the adjustable tonneau cover 10 can be made of substantially flexible material that is capable of being extended from and retracted within the housing 16 of the adjustable tonneau cover 10. Such materials can include, but are not limited to, leather, fabrics, elastic materials, plastic-type fabrics, cloth, as well as other similar type materials. It is contemplated that the material of the first and second covers 18, 26 of the adjustable tonneau cover 10 will be of a thickness sufficient such that the material can be wound or otherwise disposed within the housing 16, while also minimizing the size of the housing 16 to accommodate the first and second covers 18, 26 being disposed therein. The housing 16 can be made of a substantially rigid material that can include, but is not limited to, metal, plastic, polymer, composite, combinations thereof, and other similar and substantially rigid materials.

In various embodiments, the one or more cover tabs 20 of the first cover 18 and the one or more seat tabs 30 of the seatback 28 can be made of various rigid materials that can include, but are not limited to, metal, plastic, polymers, composites, combinations thereof, and other similar rigid materials. It is contemplated that the cover tab 20 and the seat tab 30 may be coated in a substantially smooth-type coating to allow for the first angled member 100 of the seat tab 30 to slidably engage and displace the second angled member 104 of the cover tab 20 when the seatback 28 is rotated to the upright position 32 to engage the cover tab 20 with the seat tab 30.

In various alternate embodiments, the recess 92 of the seatback 28 can include a horizontal bar, rather than a seat tab 30, that is configured to engage the cover tab 20. In such an embodiment, it is the horizontal bar that exerts a substantially vertical biasing force against the cover tab 20 to displace the cover tab 20. Once the horizontal bar passes the second angled member 104 of the cover tab 20, the cover tab 20 rotates into engagement with the horizontal bar. As with previous embodiments, the cover tab 20 is disengaged by rotating the seatback 28 to the folded position 90. It is contemplated that the horizontal bar can be disposed on the first cover 18 and the cover tabs 20 removed so that the horizontal bar of the cover tab 20 is configured to engage seat tabs 30 disposed on the seatback 28.

Referring now to the embodiments shown in FIGS. 1-10, in operation, the housing 16 of the adjustable tonneau cover 10 can be selectively removed and installed within the housing receptacle 40 defined by the interior side panels 42 of the vehicle 14. When installed, each of the one or more cover tabs 20 of the first cover 18 will be biased by the rotational biasing mechanism 62 of the front spool 60 such that the cover tabs 20 are disposed within the alignment tabs 110 in a substantially horizontal configuration to receive the seat tabs 30. As discussed above, the position of the cover tab 20 to receive the seat tabs 30 can, in various embodiments, be some other predetermined angle configured to matingly receive the seat tabs 30 when the seatback 28 is rotated to the upright position 32, or the rear seat 24 is moved laterally to the rearward position 52. When the seatback 28 is rotated to the upright position 32 and/or the rear seat 24 is moved to the rearward position 52, the cover tab 20 is positioned within the recess 92 proximate the seat tab 30 fixed within the recess 92. As the seatback 28 is rotated to the upright position 32 and/or moved laterally to the rearward position 52, the first angled member 100 of the seat tab 30 exerts the downward biasing force 102 against the second angled member 104 of the cover tab 20 to displace the cover tab 20. When the seatback 28 is moved proximate the fully upright position 32 and/or the fully rearward position 52, the first angled member 100 of the seat tab 30 passes the second angled member 104 of the cover tab 20. In this manner, the downward biasing force 102 of the seat tab 30 is removed and the cover tab 20 returns to the predetermined position to engage with the seat tab 30, thereby coupling the first cover 18 with the seatback 28. When so engaged, the rear seat 24 can be moved laterally between the rearward and forward positions 52, 50, without disengaging the first cover 18 from the seatback 28. This engagement allows the first cover 18 to extend from the housing 16 to match the lateral movement of the rear seat 24 between the forward and rearward positions 50, 52.

In various embodiments, the rotation of the seatback 28 between various reclining positions and the upright position 32 does not disengage the seat tab 30 from the cover tab 20. The seat tab 30 and cover tab 20 are configured such that the rotation of the seatback 28 from the upright position 32 to the folded position 90 will serve to disengage the cover tab 20 from the seat tab 30, but not other reclining and inclining rotational movements of the seatback 28. As discussed above, where the rear seat 24 is divided into seating subsections 82, the first cover 18 is similarly divided into cover subsections 80 that cooperate with each of the respective seating subsections 82. In this manner, when in use, each individual seating subsection 82 can be moved, laterally and rotationally, independently of the other seating subsections 82 to engage and/or disengage from the corresponding first cover subsection 80.

Referring again to the illustrated embodiments of FIGS. 1-4, after the housing 16 of the adjustable tonneau cover 10 is installed, the second cover 26 can be extended from the rear aperture 122 of the housing 16 such that the rigid member 128 disposed at the end 126 of the second cover 26 can be installed within the secondary receptacle 130 to substantially cover the rear portion 132 of the rear cargo area 12. Similarly, the first and second covers 18, 26 can be disengaged such that they retract back toward the housing 16. The housing 16 can then be removed, thereby making the rear cargo area 12 a substantially continuous cargo space for the placement of substantially larger items or numerous items within the rear cargo area 12.

In various embodiments, the adjustable tonneau cover 10 can be used in vehicles 14 that have both second and third row seating. In such an embodiment, the adjustable tonneau cover 10 is typically installed when the third row seat is stowed away to a folded position 90, thereby forming a large rear storage area that can be covered by the adjustable tonneau cover 10. In various embodiments, where a vehicle 14 includes a third row seat that can be laterally adjustable, the adjustable tonneau cover 10 can be installed such that it engages the back of the third row seat thereby covering the rear cargo area 12 between the third row seat and the rear door or lift gate 134 of a vehicle 14 to cover the rear cargo area 12. It is contemplated that in vehicles 14 having second and third row seats, the adjustable tonneau cover 10 can be used to alternately cover the rear cargo area 12 defined by the third row seat or, when the third row seat is stowed away, can cover the rear cargo area 12 behind the second row seat. In such an embodiment, the housing receptacle 40 and the secondary receptacle 130 that are defined by the interior side panels 42 of the vehicle 14 have a substantially similar size such that the housing 16 can be installed in either the housing receptacle 40 or the secondary receptacle 130. Additionally, the cover tabs 20 can be configured to engage either the second or third row seats depending upon whether the first cover 18 will be engaged with the second row seat or the third row seat. When the adjustable tonneau cover 10 is used to engage the third row seat and the front cover engages the back of the third row seat, the second cover 26 can be fully retracted and disposed such that the rigid member 128 of the second cover 26 is biased against the housing 16 when the second cover 26 is not in use.

Figure 11:
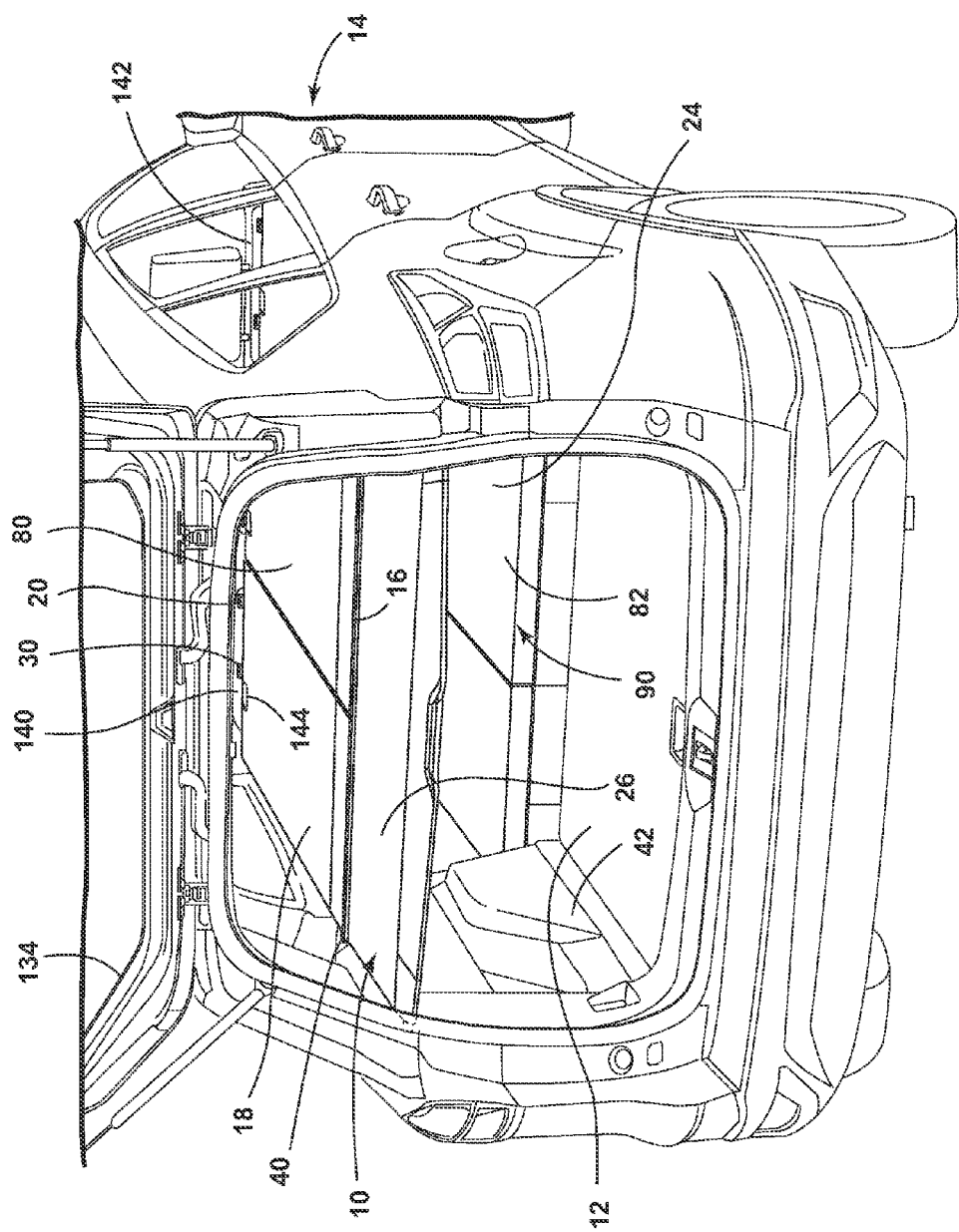
FIG. 11 is a rear top perspective view of a vehicle with another embodiment of the tonneau cover installed within and extended across the rear cargo area and attached to the back of the front seats.

As illustrated in the embodiment of FIG. 11, it is also contemplated that, in various embodiments, the cover tab 20 of the first cover 18 can be engaged with a seat tab 30 disposed on the back of the front seats 140. In such an embodiment, the first cover 18 or cover subsection 80 can engage with the front seat 140 when the rear seats 24 or seating subsections 82, being second row or third row seats, or both, are placed in a folded position 90. Accordingly, the adjustable tonneau cover 10 is configured to cover the entire rear cargo area 12 behind the front seats 140. It is further contemplated that, in such an embodiment, the cover tabs 20 can only be engaged and disengaged from the seat tabs 30 of the front seat 140 by the user manually connecting and disconnecting the cover tabs 20 to the seat tabs 30. In various embodiments, the front passenger seat 142 can be operated between upright and folded positions 40, 90, similar to the rear seat 24, and can be configured to disengage the cover tab 20 from the seat tab 30 when moved to the folded position 90, as described above. In various embodiments, the first cover 18 can include a handle member 144 that is configured to enable the user to manually connect the cover tabs 20 of the first cover 18 to the seat tabs 30 of either the rear seats 24 or the front seats 140.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A tonneau cover for a vehicle comprising:
    a housing;
    a first cover having a cover tab, wherein the first cover selectively extends from an interior of the housing to engage a rear seat;
    a second cover selectively extendable from the interior of the housing opposite the first cover; and
    a seatback of the rear seat having a seat tab that engages the cover tab when the seatback is placed in an upright position, wherein when the rear seat is in a rearward position and the seatback is moved to the upright position, the seat tab places a biasing force on the cover tab to rotationally displace the cover tab, and when the seatback is in the upright position, the biasing force of the seat tab is removed and the cover tab is engaged with the seat tab.

2. The tonneau cover of claim 1, wherein the rear seat is laterally operable between forward and rearward positions, and wherein when the seat tab and cover tab are engaged, the cover tab remains engaged with the seat tab as the rear seat is moved between the forward and rearward positions when the seatback is in the upright position.

3. The tonneau cover of claim 2, wherein the rotation of the seatback from the upright position to a folded position selectively disengages the cover tab from the seat tab.

4. The tonneau cover of claim 2, wherein the housing includes a front spool coupled to the first cover and configured to rotate within the housing to selectively extend and retract the first cover, and wherein the housing includes a rear spool coupled to the second cover and configured to rotate within the housing to selectively extend and retract the second cover, and wherein the housing includes front and rear apertures through which the first and second covers extend, respectively.

5. The tonneau cover of claim 4, wherein the front spool is rotationally biased to place the first cover in a front retracted position defined by the cover tab being proximate the front aperture of the housing and positioned to receive the seat tab, and wherein the rear spool is rotationally biased to place the second cover in a rear retracted position, wherein the second cover is substantially disposed within the housing.

6. The tonneau cover of claim 1, wherein the housing is selectively engaged with a housing receptacle defined by interior side panels of a vehicle.

7. The tonneau cover of claim 2, wherein the rear seat can include two or more individually operable seats, and wherein the first cover includes a plurality of cover subsections that each correspond to one of the respective two or more individually operable seats.

8. A vehicle tonneau cover comprising:
    first and second covers wound in a removable housing, each having a cover tab selectively extendable from the removable housing; and
    a seat tab disposed in a rear seatback that couples with at least one cover tab when the seatback is moved into an upright position, wherein the movement of the seatback into the upright position causes the seat tab to couple with the at least one cover tab.

9. The vehicle tonneau cover of claim 8, wherein the movement of the seatback from the upright position to a folded position selectively disengages the at least one cover tab from the seat tab.

10. The vehicle tonneau cover of claim 9, wherein the removable housing includes a first biasing mechanism coupled to the first cover;
    a second biasing mechanism coupled to the second cover, wherein the first and second biasing mechanisms are configured to bias the first and second covers in retracted positions wherein each cover tab is disposed proximate the removable housing and positioned to receive the seat tab.

11. The vehicle tonneau cover of claim 10, wherein the seatback is laterally operable between forward and rearward positions, and wherein after the seat tab and the at least one cover tab are engaged, the at least one cover tab remains engaged with the seat tab as the seatback is moved between the forward and rearward positions.

12. The vehicle tonneau cover of claim 8, wherein the removable housing is selectively engaged with a housing receptacle defined by interior side panels of a vehicle.

13. The vehicle tonneau cover of claim 8, wherein the seatback seat can include two or more individually operable seats, and wherein the first and second covers correspond to respective individually operable seats.

14. The vehicle tonneau cover of claim 11, wherein when the setback is in the rearward position and the seatback is moved toward the upright position, the seat tab places a biasing force on the at least one cover tab to displace the cover tab, and wherein when the seatback is in the upright position, the biasing force of the seat tab is removed and the cover tab is engaged with the seat tab.

15. A tonneau cover for a vehicle comprising:
    a cover housing having a forward-extendable cover selectively extending from an interior of the cover housing, wherein the forward-extendable cover is biased toward the cover housing; and
    a rear seat configured to engage the forward-extendable cover when the rear seat is in a seating position, and further configured to disengage the forward-extendable cover when the rear seat is moved to a folded position, wherein when the rear seat is in a rearward position and is moved toward the seating position, the rear sear places a biasing force on a cover tab of the forward-extendable cover to displace the cover tab, and wherein when the seatback is in the seating position, the biasing force of the rear seat is removed and the cover tab of the forward-extendable cover is engaged with the rear seat.

16. The tonneau cover of claim 15, further comprising a rearward-extendable cover selectively extendable from the cover housing.

17. The tonneau cover of claim 15, wherein the rear seat is laterally operable between a forward position and the rearward positions, and wherein after the forward-extendable cover is engaged with the rear seat, the forward-extendable cover remains engaged with the rear seat as the rear seat is moved between the forward and rearward positions.

18. The tonneau cover of claim 15, wherein the rear seat includes two or more individually-operable seating subsections, and wherein the forward-extendable cover includes a plurality of cover subsections that each correspond to one of the respective two or more individually-operable seating subsections.

* * * * *